United States Patent [19]

Lindén

[11] Patent Number: 5,426,857
[45] Date of Patent: Jun. 27, 1995

[54] PIVOTED HAND-HELD CUTTING TOOL

[75] Inventor: Erkki O. Lindén, Billnäs, Finland

[73] Assignee: Fiskars Oy Ab, Helsinki, Finland

[21] Appl. No.: 217,916

[22] Filed: Mar. 25, 1994

Related U.S. Application Data

[63] Continuation-in-part of Ser. No. 23,811, Feb. 26, 1993, Pat. No. 5,325,592, which is a continuation-in-part of Ser. No. 986,057, Nov. 30, 1992, Pat. No. 5,341,573.

[51] Int. Cl.6 .............................. B26B 13/16
[52] U.S. Cl. ........................ 30/262; 30/254; 76/106.5
[58] Field of Search ............... 30/254, 258, 260, 261, 30/262, 266, 271; 76/104.1, 106.5

[56] References Cited

U.S. PATENT DOCUMENTS

| | | | |
|---|---|---|---|
| 25,508 | 9/1859 | Heinisch | 30/266 |
| 94,247 | 8/1869 | Seymour | 30/266 |
| 4,007,525 | 2/1977 | Hannes et al. | 30/266 |
| 4,073,059 | 2/1978 | Wallace et al. | 30/261 |
| 4,114,268 | 9/1978 | Hildebrandt et al. | 30/262 |
| 4,156,311 | 5/1979 | Wallace et al. | 30/262 |
| 4,258,472 | 3/1981 | Wallace et al. | 30/262 |
| 4,268,963 | 5/1981 | Harrison | 30/262 |
| 4,534,109 | 8/1985 | Bush et al. | 30/260 |
| 4,715,122 | 12/1987 | Lindén | 30/260 |
| 4,779,343 | 10/1988 | Hacikyan | 30/258 |
| 4,914,820 | 4/1990 | Saito | 30/254 |
| 4,947,553 | 8/1990 | Bendickson et al. | 30/262 |
| 5,179,783 | 1/1993 | Melter | 30/262 |
| 5,325,592 | 7/1994 | Linden et al. | 30/254 |
| 5,341,573 | 8/1994 | Linden et al. | 30/254 |

FOREIGN PATENT DOCUMENTS

533355 10/1976 U.S.S.R. ................ 30/262

Primary Examiner—Hwei Siu Payer
Attorney, Agent, or Firm—Foley & Lardner

[57] ABSTRACT

A hand tool for cutting, such as a pair of snips, includes a pair of opposed elongated members, each member comprising a jaw at a front end portion thereof, a handle at a rear end portion thereof, and a midportion where the members cross over each other. A pivot unites the midportions for scissor-like movement of the handles and jaws about the pivot, and a spring biases the handles and jaws to an open position. A releasable locking mechanism is provided to secure the handles and jaws in a closed position. According to the invention, at least one of the members includes a metal plate having a forwardly extending blade which comprises one of the jaws and a rearwardly extending tang. The handles, pivot and locking mechanism are each made of a moldable material molded onto the metal plate, such that one of the handles is molded onto the tang of the metal plate, and the pivot extends through a central hole in the metal plate. The moldable material is most preferably a plastic, but other moldable substances could be employed.

19 Claims, 5 Drawing Sheets

PIVOTED HAND-HELD CUTTING TOOL

CROSS-REFERENCE TO RELATED APPLICATIONS

This is a continuation-in-part application of U.S. patent application Ser. No. 08/023,811, filed Feb. 26, 1993, having issued on Jul. 5, 1994 as U.S. Pat. No. 5,325,592 which is a continuation-in-part application of U.S. patent application Ser. No. 07/986,057, filed Nov. 30, 1992, having issued on Aug. 30, 1994 as U.S. Pat. No. 5,341,573.

FIELD OF THE INVENTION

The present invention relates generally to hand-held cutting tools, particularly to pruning snips.

BACKGROUND OF THE INVENTION

Pivoted implements having elongated members disposed for cooperative engagement about a pivotable joint are widely used. In particular, pivoted tools such as pruning snips generally comprise two elongated members, typically made of stamped or forged metal or other suitable material, disposed for cooperative engagement about the pivotable joint. Typically, each member includes a jaw, having a working end and an opposed tang, and a handle conforming to the fingers or hands of the user and preferably molded onto the force-applying end or tang of the jaw. In the case of "by-pass" pruning snips, the jaws consist of two cooperable blades; in "anvil-type" snips, a blade cooperates with an anvil to perform the desired cutting operation.

Conventional molding operations used to form the handles of by-pass snips consist of positioning a jaw (i.e., the blade) having an aperture in a suitable cavity of a mold wherein the jaw is fixed in position with respect to the mold. As described in U.S. Pat. No. 4,715,122 to the present inventor, the space receiving the jaw communicates with a mold cavity for the handle portion. The mold cavity is subsequently filled with a fluid plastic material or the like, whereby the plastic material surrounds the tang of the jaw so that the handle is molded onto the tang. The same operation is separately repeated to form the handle of the other jaw which, in the case of an anvil-type pruner, is formed as an anvil. The two handle sub-assemblies are then inventoried as required.

The manufacturing of pruning snips or other similar pivotable tools then consists of bringing the apertures of the jaw/handle sub-assemblies into registration to install a separate pivot member, typically including a fastener, to maintain the jaws in cooperative assembled relationship about the pivotable joint. The biasing and latching mechanisms of the tool are next installed.

Accordingly, pruning snips of the type disclosed in the prior art typically comprise various components and require several distinct manufacturing steps followed by the assembling of sub-assemblies. Examples of such pruning snips are described in U.S. Pat. No. 4,073,059, issued Feb. 14, 1978, and U.S. Pat. No. 4,258,472, issued Mar. 31, 1981, both to Wallace et al.; U.S. Pat. No. 4,268,963, issued May 26, 1981 to Harrison; and U.S. Pat. No. 4,947,553, issued Aug. 14, 1990 to Bendickson et al. U.S. Pat. Nos. '059, '963, and '553 illustrate examples of by-pass pruners, while the '472 patent discloses a pair of anvil pruners.

The limitations identified above are also present more generally in the scissor art. However, in that art, attempts have been made to address these limitations. For example, die cast scissors produced by the intercasting technique permit a reduction in the number of steps required to produce these pivoted tools. Examples of tools manufactured in accordance with this process are disclosed in U.S. Pat. No. 4,007,524 to Hannes et al. Although, as Hannes discloses, the intercasting method eliminates certain assembling operations necessary in the case of the prior art pruning snips discussed above, tools manufactured by the intercasting technique do not typically include molded handles and do not permit subsequent adjustment of the pivotable joint as desired by the user of the tool. Furthermore, these tools generally lack biasing and associated latching mechanisms.

In light of the foregoing, it can readily be recognized that prior art methods used to manufacture pivoted garden tools, such as pruning snips or the like, have certain disadvantages. These prior art methods typically require assembling two members which have been previously manufactured separately and installing various other components to provide the desired features, thereby increasing material handling requirements which generally translate into higher unit cost. Thus, it appears desirable to provide pivoted tools such as pruning snips or the like which can alleviate the problems associated with conventional manufacturing methods, i.e., which are engineered to lend themselves to functional assembling during, as opposed to subsequent to, the manufacturing process, or which otherwise reduce the number of operations required to manufacture these tools, while having all necessary features typically desired by users of these tools.

SUMMARY OF THE INVENTION

The present invention facilitates the manufacturing of pruning snips or similar hand cutting tools by simplifying the manufacturing process and eliminating secondary assembly operations typically required with such pivoted implements, and by improving, or at least maintaining, the functional quality of these tools. A method for making a hand cutting tool in accordance with the invention is characterized in that a metal plate including a jaw is disposed in a cavity of a mold to which an uncured or otherwise flowable polymer, copolymer or the like is supplied, as by injection, to form a handle at the force-applying end of the jaw. The flowable material is also supplied to a second cavity of the mold forming the second elongated member as an integral, unitary member comprising the anvil, the pivot post, and the handle. Accordingly, tools in accordance with the invention can be constructed without requiring post manufacturing assembling operations, other than mounting of the spring.

A pivoted hand tool according to one aspect of the invention includes a pair of opposed elongated members, each member comprising a jaw at a front end portion thereof, a handle at a rear end portion thereof, and a midportion where the members cross over each other. A pivot unites the midportions for scissor-like movement of the handles and jaws about the pivot, and a spring biases the handles and jaws to an open position. A releasable locking mechanism is provided to secure the handles (and therefore the jaws) in a closed position. According to the invention, at least one of the members includes a metal plate having a forwardly extending blade which comprises one of the jaws and a rearwardly extending tang. The handles, pivot and locking mechanism are each made of a moldable material molded onto the metal plate, such that one of the handles is molded onto the tang of the metal plate, and the pivot extends through a central aperture in the metal plate. The moldable material is most preferably a plastic, but other moldable substances could be employed.

According to a further embodiment of the invention, in a pair of pruning snips having a jaw with a molded handle and an anvil integrally molded with its associated handle, the pivotable joint comprises a fastener and a pivot member. The pivot member is molded as an integral part of one of the handles, the fastener and pivot member cooperating to permit functional adjustment of the tool.

According to a another aspect of the invention, the metal plate has a curved edge on a midportion thereof between the blade and the tang. The curved edge defines a sector having a center which is offset from a center of the pivot, and the second member has a wall which comes into engagement with the curved edge as the tool opens, thereby limiting the extent to which the tool can open.

A preferred method for making a hand cutting tool according to the invention includes the steps of positioning a metal plate having a forwardly extending blade which comprises one of the jaws and a rearwardly extending tang into a mold, then molding the handles, pivot and locking mechanism onto the metal plate using a moldable plastic, such that one of the handles is molded onto the tang of the metal plate to form the first elongated member, and the pivot extends through a central aperture in the metal plate, and then mounting the spring in a position for biasing the tool to an open position.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF A PREFERRED EXEMPLARY EMBODIMENT

The invention relates to pivoted tools having elongated members disposed for cooperative engagement about a pivotable joint wherein a force supplied to the force-applying end of the tool is transmitted through the pivotable joint to the opposed working end of the elongated members and transferred to an item engaging the working pieces or jaws.

Figure 1:
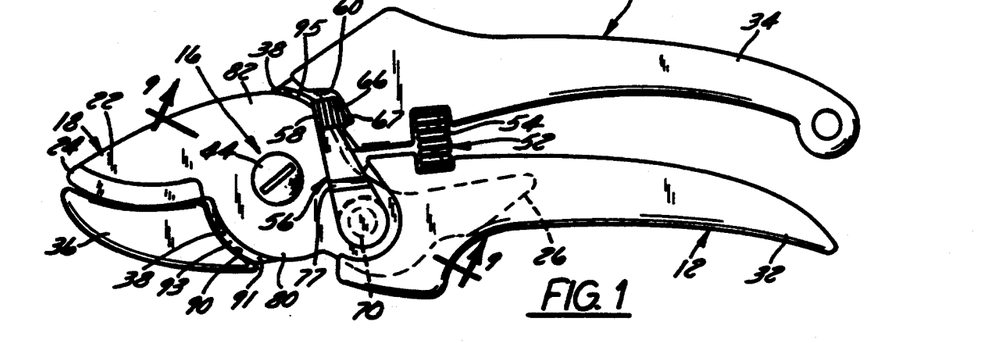
FIG. 1 is a top plan view of pruning snips in accordance with one aspect of the invention, shown in the closed position.
Figure 2:
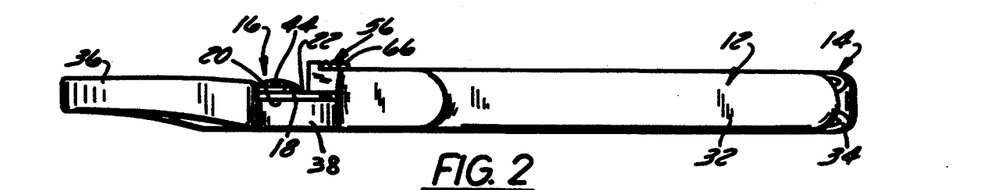
FIG. 2 is a front elevational view of the snips of FIG. 1.
Figure 3:
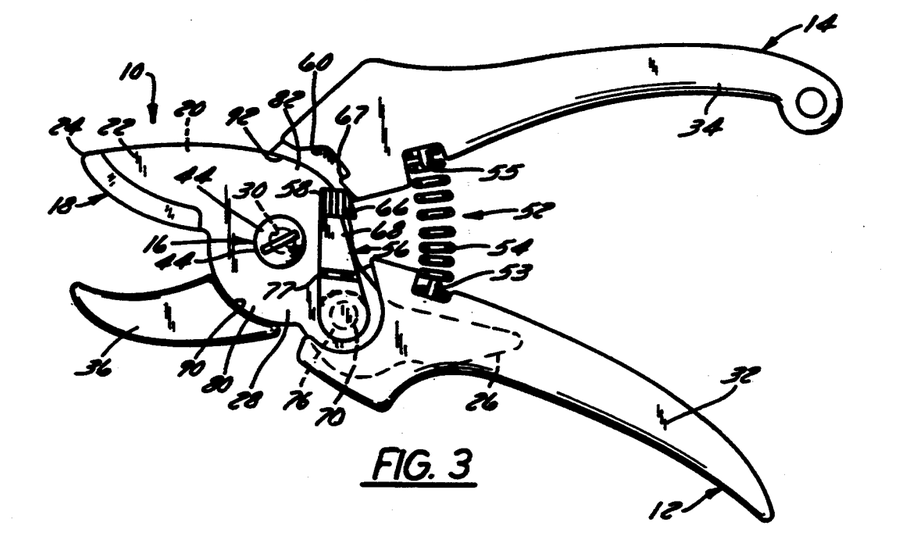
FIG. 3 is a top plan view of the snips of FIG. 1, shown in the open position.
Figure 4:
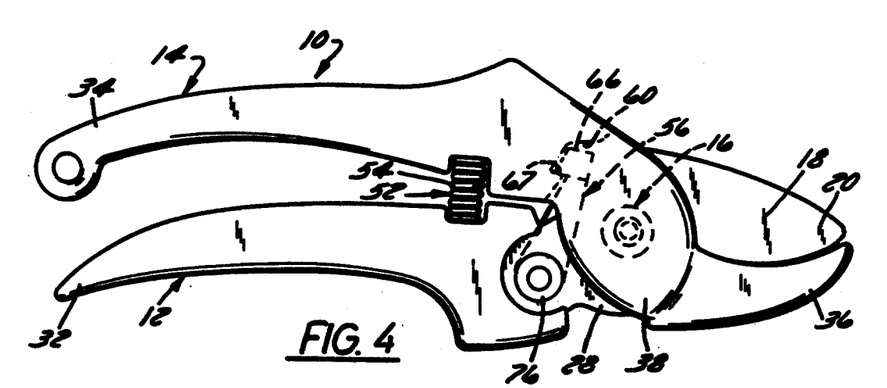
FIG. 4 is a bottom plan view of the snips of FIG. 1, shown in the closed position.
Figure 5:
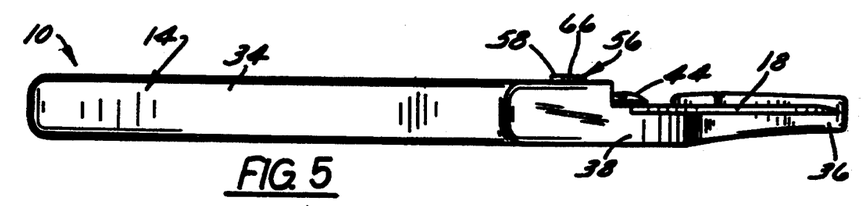
FIG. 5 is a rear elevational view of the snips of FIG. 1.
Figure 6:
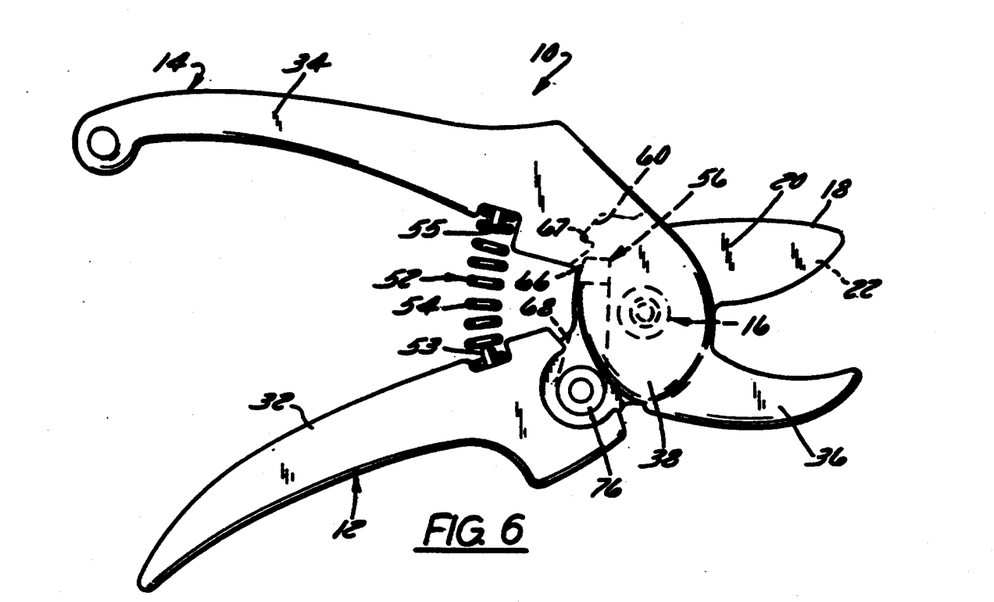
FIG. 6 is a bottom plan view of the snips of FIG. 1, shown in the open position.
Figure 7:
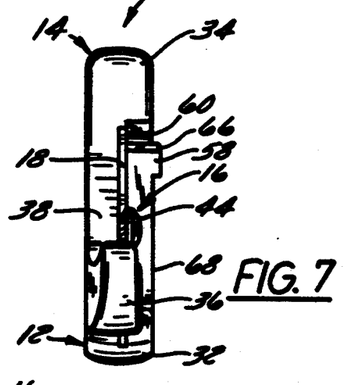
FIG. 7 is a left side elevational view of the snips of FIG. 1.
Figure 8:
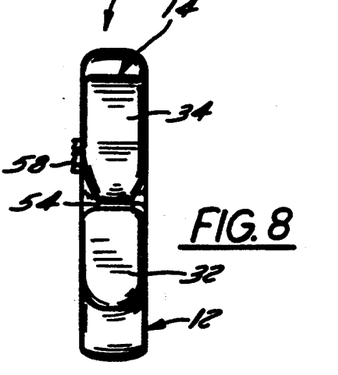
FIG. 8 is a right side elevational view of the snips of FIG. 1.

Referring to FIGS. 1-3, a pair of snips 10 according to the invention includes first and second elongated members 12 and 14, respectively, joined for scissor action about a pivotable joint 16. Elongated member 12 includes a steel plate 18 having an inner surface 20 and a spaced outer surface 22. Plate 18 comprises a first jaw 24 in the form of a cutting blade, an opposed force-applying end or tang 26, and a midportion or pivot region 28 intermediate jaw 24 and tang 26. Pivot region 28 is provided with a central aperture 30 formed therein. Elongated member 12 also comprises a first handle 32 molded into engagement with tang 26. Referring to FIGS. 4-6, second elongated member 14 is a unitary piece of molded plastic and comprises a second handle 34 joined to a second jaw 36 by a midportion or bearing region 38.

Figures 9, 9C, 13:
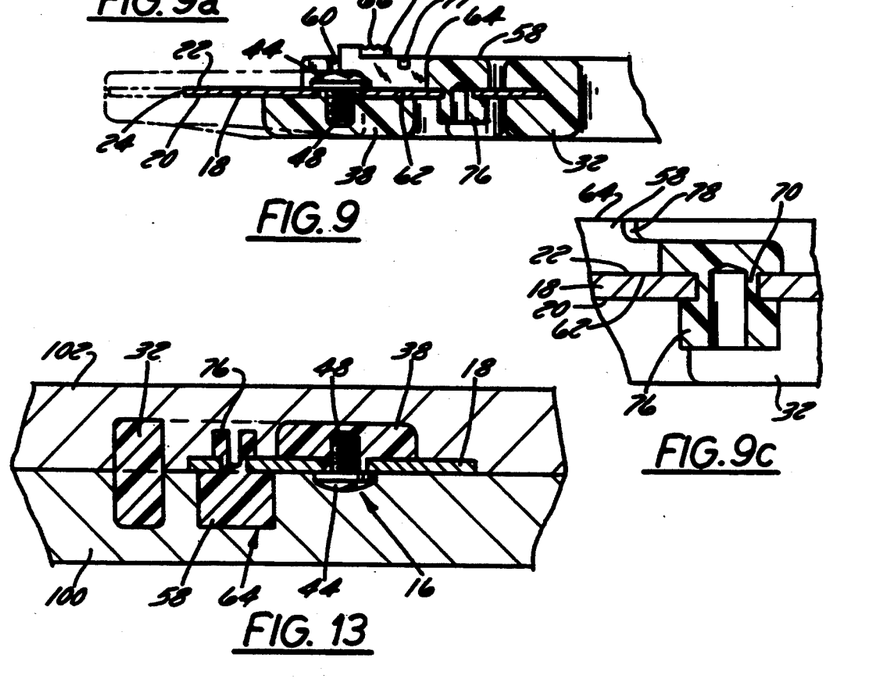
FIG. 9 is a partial sectional view taken along line 9—9 shown in FIG. 1.
FIG. 9c is a partial sectional view of the proximal end of the arm of the locking mechanism shown in FIG. 1 with the arm including a stepped down region.
FIG. 13 is a partial sectional view taken along line 13—13 shown in FIG. 12.
Figure 9A:
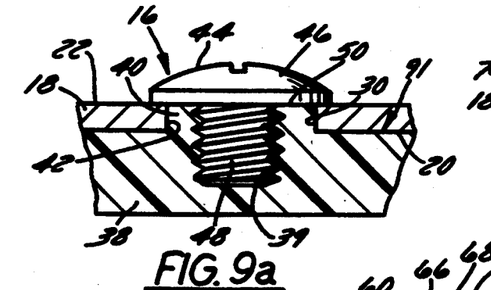
FIG. 9a is an enlarged partial sectional view of the pivotable joint of the snips of FIG. 1.
Figure 9B:
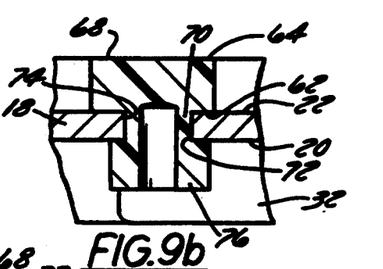
FIG. 9b is an enlarged partial sectional view of the post of the locking mechanism of the snips of FIG. 1.

Referring more particularly to FIGS. 9, 9a and 13, pivot 16 comprises a plastic pivot post 40 integrally formed with bearing region 38 which is unitary with handle 34 and jaw 36. Post 40, which is formed in situ, i.e., within the mold cavity receiving plate 18, extends effectively from inner surface 20 through aperture 30 into close conforming engagement with the interior surface 42 of aperture 30. The distal end 50 of post 40 is preferably approximately flush with outer surface 22. Pivot 16 further comprises a fastener such as a screw 44 having an enlarged diameter head 46 and a threaded stem 48 secured in a central threaded hole 39 in post 40. Because post 40 extends only to the juncture of outer surface 22 and aperture 30, head 46 lies adjacent to and is effectively in contact with both outer surface 22 and end 50 of post 40. Screw 44 secures the elongated members 12, 14 together and can be tightened or loosened to control the compressive force applied to elongated members 12, 14 by the pivot mechanism 16. In forming pivot 16, screw 44 may be inserted into the mold cavity in its desired position together with plate 18, so that plastic fills in around it to form threaded hole 39.

Members 12 and 14 are resiliently biased to an open position by resilient biasing means 52. As shown in FIGS. 1 and 3, biasing means 52 comprises a compression spring 54 the ends of which are mounted on inwardly directed opposing pins 53, 55 formed on handles 32, 34, respectively. In the alternative, the ends of spring 54 could be confined in recesses in each of molded handles 32, 34, or an alternate biasing mechanism, such as a leaf spring secured to one handle and having a free end engaging the other handle, could be employed.

A releasable locking mechanism 56 functions against biasing means 52. Mechanism 56 comprises a catch 58 pivotally connected to plate 18, and a recess 60 formed in handle 34. As shown in FIGS. 1, 3, 9b, 9c, and 13, catch 58 is a single plastic piece having an inner surface 62 and a spaced and oppositely facing outer surface 64. Catch 58 includes a projection or barb 66 which is formed at the distal end of a swingable arm 68. At the proximal end of arm 68, a post 70 projects from inner surface 62 of catch 58 and extends effectively from outer surface 22 of plate 18 into a second aperture 72 formed in plate 18 intermediate aperture 30 and tang 26. Post 70 conforms with an interior surface 74 of aperture 72 and terminates in an enlarged diameter head 76 lying adjacent inner surface 20 of plate 18. Because catch 58 is formed in situ, head 76 may be formed with a diameter substantially larger than aperture 72. As shown in FIG. 6, head 76 is located ahead of and spaced from handle 32. At the distal end of arm 68, barb 66 engages a suitable forwardly extending projection 67 formed on the handle on the other elongated member 14, in this example a sidewall of recess 60. To facilitate swinging operation of catch 58 which is preferably formed in situ, arm 68 includes a widthwise groove 77 extending from outer surface 64. The purpose of groove 77 is to permit arm 68 to lift slightly from outer surface 22 when catch 58 cools down during the molding process, thereby establishing a certain amount of functional clearance between outer surface 22 and inner surface 62. In the alternative and as those skilled in the art will recognize, this clearance may also be established for example by reducing the distance between surfaces 62 and 64 at the proximal end of arm 68, thereby creating a stepped down region 78 over post 70 as shown in FIG. 9c.

Figure 10:
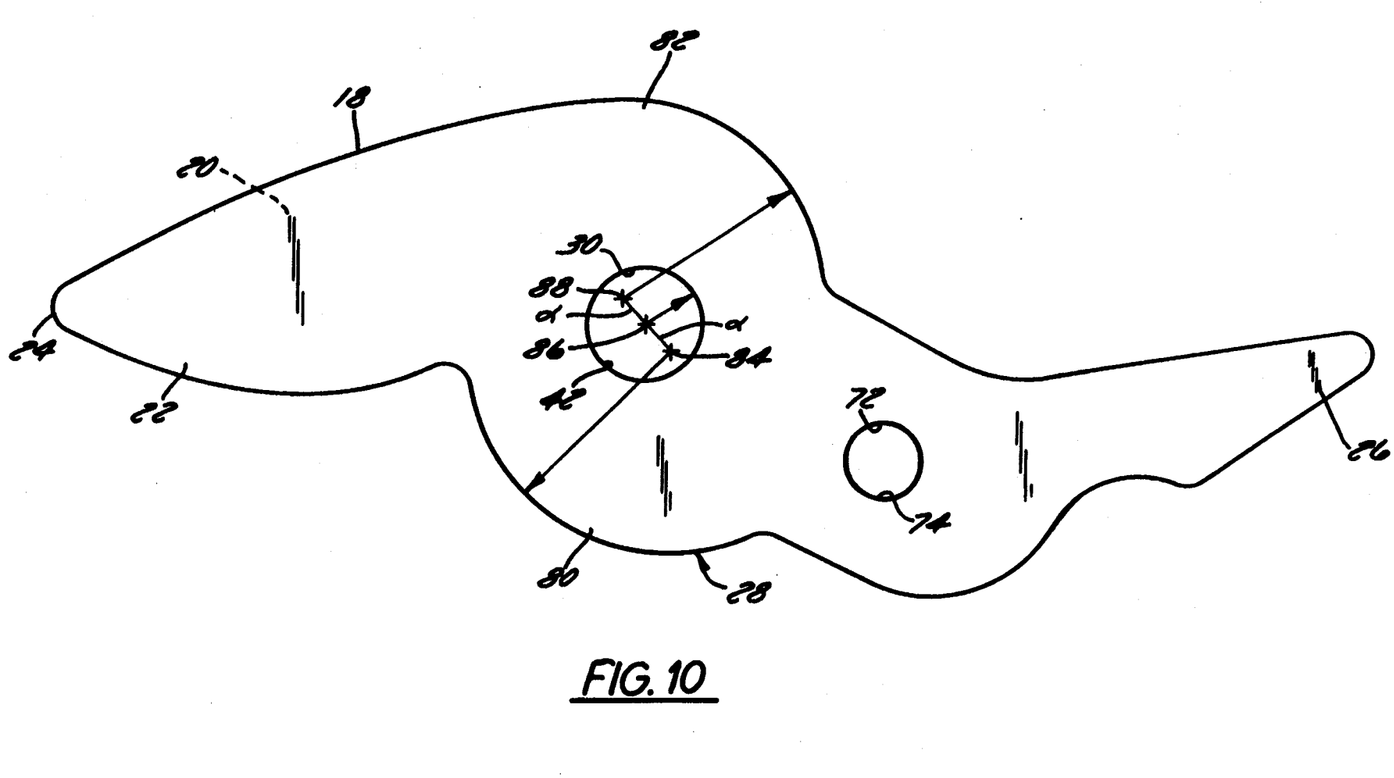
FIG. 10 is a top plan view of the metal plate used with the snips shown in FIG. 1.

Referring now to FIGS. 1, 2, and 10, pivot region 28 of plate 18 comprises first and second sectors 80, 82, respectively, disposed across aperture 30. First sector 80 is arcuate and has its center 84 offset from center 86 of aperture 30 by a distance $a$. Similarly, second sector 82 is arcuate and has its center 88 offset from center 86 by the same distance $a$ as center 84, but in an opposite direction across center 86. As can be seen in FIG. 10, pivot region 28 as a result comprises two oppositely directed eccentric sectors 80 and 82 formed around aperture 30.

Referring now to FIGS. 1 and 3, bearing region 38 includes a recess 91 in which plate 18 is mounted. Recess 91 further has first and second mutually facing arcuate walls 90, 92, respectively, formed on opposite sides of post 40. More particularly, arcuate wall 90 is formed near the juncture of second jaw 36 and bearing region 38, while arcuate wall 92 is formed near (just ahead of) the juncture of bearing region 38 and handle 34. In closed position as shown in FIG. 1, arcuate walls 90, 92 are spaced from sectors 80, 82 and having a similar curvature, so that narrow, curved grooves 93, 95 exist between walls 90, 92 and the curved edges of sectors 80, 82, respectively. Upon opening of tool 10 under the force of biasing means 52, the curved edge of sector 80 moves into engagement with wall 90 while sector 82 moves into engagement with wall 92, closing grooves 93, 95 due to the eccentric movement of sectors 80, 82 around center 86 rather than centers 84, 88. This limits opening of the tool 10 to the position shown in FIG. 3 and prevents the distance between handles 32 and 34 from becoming greater so that they can be grasped with one hand when tool 10 is open, and so that spring 54 remains mounted on pins 53, 55. Only one sector 80 or 82 and curved wall 90 or 92 is actually needed to limit opening of the tool.

Figure 11:
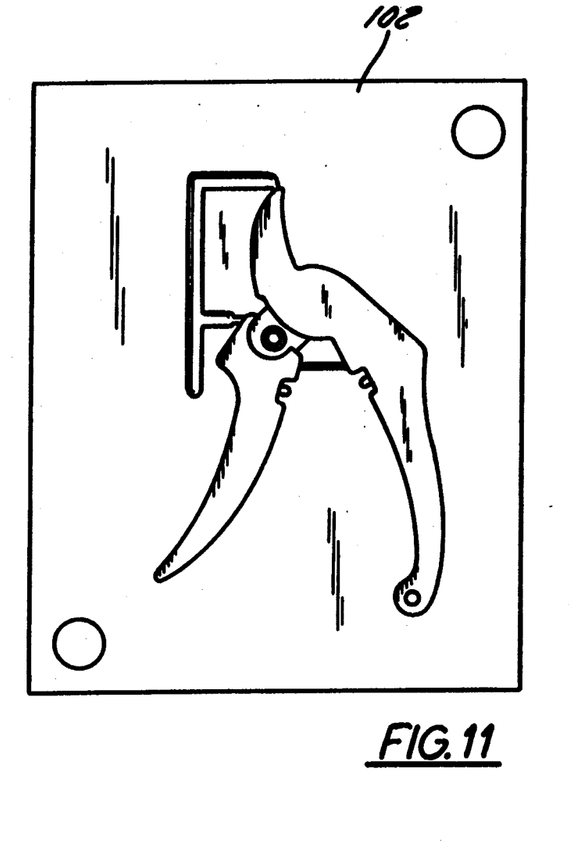
FIG. 11 is a top plan view of one half of a mold for the manufacture of the snips shown in FIG. 1.
Figure 12:
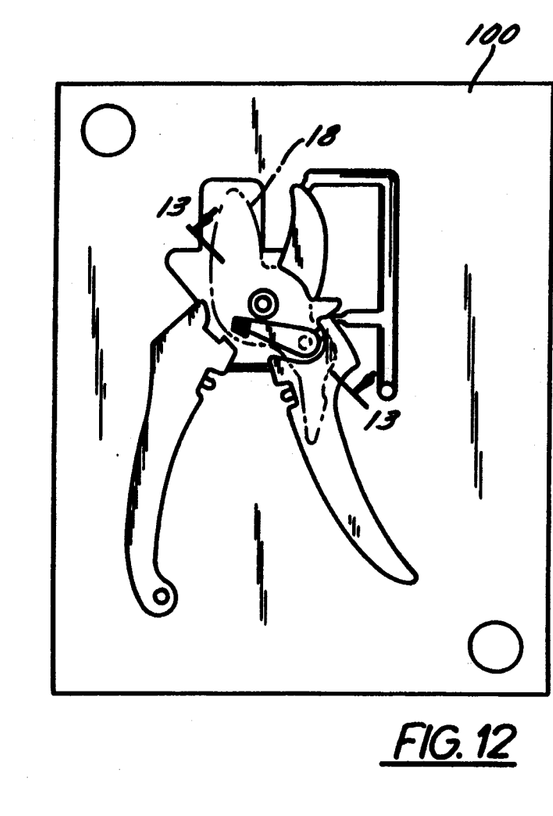
FIG. 12 is a top plan view of the other half of the mold for the manufacture of the snips shown in FIG. 1.

Referring now to FIGS. 11 and 12, snips 10 are formed in one molding operation in a mold comprising two halves, each half being generally designated as 100, 102. As more particularly shown in FIG. 13, catch 58 is formed in situ in a cavity of mold half 100. On the other hand, bearing region 38 and post 40 are formed in situ in a cavity of the other mold half 102.

Pruning snips according to the invention can be manufactured with improved facility, eliminating secondary assembling operations typically required with prior art items of this sort. The manufacturing cost of tools in accordance with the invention is noticeably reduced, and consistency of the appearance and the functional characteristics of these tools can be improved.

It is understood that the above description is of a preferred exemplary embodiment of the invention, and that the invention is not limited to the specific forms described. For example, tools in accordance with the invention having a unitary pivot could comprise a pair of opposed cutting blades, as in by-pass pruners, instead of a blade cooperating with an anvil as described in the preferred embodiment. In such a case, the second elongated member will be similar to elongated member 12. In other words, the second elongated member will comprise a handle molded into engagement with a plate similar to plate 18, and the pivotable joint will include a plastic post formed separately from, but concurrently with, the molding of the handles. The pivot post extends through both of the metal plates and has an enlarged diameter head on one or both sides. To limit opening, a rear sector and molded curved wall similar to sector 82 and wall 92 can be provided.

This by-pass embodiment of the invention similarly reduces manual assembling operations. To manufacture these by-pass snips, the two jaws/plates are disposed in a mold receiving a fastener, and suitable, flowable material is supplied to the mold to form the pivot, handles, and catch mechanism.

Moreover, even though the preferred embodiment of the invention shows a catch mechanism having a particular configuration, those skilled in the art will appreciate that this mechanism can be formed in other ways without departing from the scope of this invention. For example, the catch could be attached to the plate 18 at another location, so long as the projection for retaining the catch is formed at a corresponding location on the other elongated member. Such constructions are considered to be within the scope of this invention. Likewise, a conventional latch mechanism, e.g. of the type mounted between the handles, could be provided in place of the molded catch, although this would require additional assembly steps. These and other substitutions, modifications, changes and omissions may be made in the design and arrangement of the elements and in the manufacturing steps disclosed herein without departing from the scope of the appended claims.

I claim:

1. A pivoted hand tool comprising:

a pair of first and second, opposed elongated members, each member comprising a jaw at a front end portion thereof, a handle at a rear end portion thereof, and a midportion where the members cross over each other, the first elongated member including a metal plate having a forwardly extending blade which comprises one of the jaws and a rearwardly extending tang, and the handle of the first member mounted on the tang of the metal plate;

a pivot mounted in a central aperture in the metal plate, which pivot unites the midportions for scissor-like movement of the handles and jaws about the pivot;

a spring mechanism biasing the handles and jaws to an open position; and a releasable locking mechanism for securing the handles and jaws in a closed position, including a catch mounted in a second aperture provided in the plate at a position offset from the central aperture, and a first projection formed on the second elongated member, the catch comprising a post mounted for pivotal movement in the second aperture, the post extending through the second aperture from an outer surface of the plate to an inner surface thereof and having an enlarged head which retains the catch in the second aperture, the catch further comprising an arm extending from the post on the outer surface of the plate, the arm having a second projection on a distal end thereof configured for releasable engagement with the first projection.

2. The hand tool of claim 1, wherein the first projection comprises a wall of a frontwardly opening recess in the handle located on the second elongated member.

3. A pivoted hand tool, comprising:

a pair of first and second, opposed elongated members, each member comprising a jaw at a front end portion thereof, a handle at a rear end portion thereof, and a midportion where the members cross over each other, the first elongated member including a metal plate having a forwardly extending blade which comprises one of the jaws and a rearwardly extending tang, and the handle of the first member made of a moldable material molded onto the tang of the metal plate;

a pivot made of a moldable material molded in a central aperture in the metal plate, the molded pivot including a round post extending from an inner surface of the plate through the central aperture into close conforming engagement with an interior surface of the central aperture to a point lying substantially flush with an outer surface of said plate, which pivot unites the midportions for scissor-like movement of the handles and jaws about the pivot;

a spring mechanism biasing the handles and jaws to an open position; and a releasable locking mechanism made of a moldable material molded onto the outer surface of the metal plate for securing the handles and jaws in a closed position.

4. The hand tool of claim 3, wherein the moldable material is a plastic, and the second elongated member is made of plastic, the jaw thereof comprising an anvil configured for engagement with the blade, and the round post being integral with the second member.

5. The hand tool of claim 4, wherein the locking mechanism comprises a catch mounted in a second aperture provided in the plate at a position offset from the central aperture, and a projection formed on the handle of the second elongated member.

6. The hand tool of claim 3, wherein the locking mechanism further comprises a catch mounted in a second aperture provided in the plate at a position offset from the central aperture, and a first projection formed on the second elongated member.

7. The hand tool of claim 6, wherein the catch further comprises:

a post mounted for pivotal movement in the second aperture, the post extending through the second aperture from the outer surface of the plate to an inner surface thereof and having an enlarged head which retains the catch in the second aperture, and an arm extending from the post on the outer surface of the plate, the arm having a second projection on a distal end thereof configured for releasable engagement with the first projection, which first projection is formed on the handle of the second elongated member.

8. The hand tool of claim 7, wherein the first projection comprises a wall of a frontwardly opening recess in the handle located on the second elongated member.

9. The hand tool of claim 3, wherein the metal plate has a curved edge on a midportion thereof between the blade and the tang, which curved edge defines a sector having a center which is offset from a center of the pivot, and the second member has a wall which comes into engagement with the curved edge as the tool opens, thereby limiting the extent to which the tool can open.

10. The hand tool of claim 9, wherein the wall which comes into engagement with the curved edge is located near the front of the handle of the second elongated member.

11. The hand tool of claim 10, wherein the wall which comes into engagement with the curved edge has a curvature similar to that of the curved edge.

12. A pivoted hand tool, comprising:

a pair of first and second, opposed elongated members, each member comprising a jaw at a front end portion thereof, a handle at a rear end portion thereof, and a midportion where the members cross over each other, the first elongated member including a metal plate having a forwardly extending blade which comprises one of the jaws and a rearwardly extending tang, and the handle of the first member mounted on the tang of the metal plate;

a pivot which unites the midportions for scissor-like movement of the handles and jaws about the pivot;

a spring mechanism biasing the handles and jaws to an open position;

a releasable locking mechanism for securing the handles and jaws in a closed position;

a stop mechanism comprising a curved edge of the metal plate on a midportion thereof between the blade and the tang, which curved edge defines a sector having a center which is offset from a center of the pivot, and a wall of the second member which comes into engagement with the curved edge as the tool opens, thereby limiting the extent to which the tool can open.

13. The hand tool of claim 12, wherein the wall which comes into engagement with the curved edge is located near the front of the handle of the second elongated member.

14. The hand tool of claim 13, wherein the wall which comes into engagement with the curved edge has a curvature similar to that of the curved edge.

15. A pivoted hand tool, comprising:
a pair of first and second, opposed elongated members, each member comprising a jaw at a front end portion thereof, a handle at a rear end portion thereof, and a midportion where the members cross over each other, the first elongated member including a metal plate having a forwardly extending blade which comprises one of the jaws and a rearwardly extending tang, and the handle of the first member made of a moldable material molded onto the tang of the metal plate, and the second elongated member is made of plastic, the jaw thereof comprising an anvil configured for engagement with the blade;
a pivot mounted in a central aperture in the metal plate, which pivot unites the midportions for scissor-like movement of the handles and jaws about the pivot and includes a round plastic post integral with and extending from the second member into the central aperture in the metal plate the round post having an axial opening therein, and a fastener is secured in the axial opening in engagement with the metal plate to secure the first and second elongated members together;
a spring mechanism biasing the handles and jaws to an open position; and
a releasable locking mechanism made of a moldable material molded onto the metal plate for securing the handles and jaws in a closed position.

16. The hand tool of claim 15, wherein the fastener comprises a screw, and the axial opening is threaded for receiving the screw therein in a manner effective to control compressive force applied to the elongated members by the pivot.

17. A method for making a pivoted hand tool of the type including a pair of first and second, opposed elongated members, each member comprising a jaw at a front end portion thereof, a handle at a rear end portion thereof, and a midportion where the members cross over each other, a pivot mounted in a central aperture in a metal plate for uniting the midportions for scissor-like movement of the handles and jaws about the pivot, a spring biasing the handles and jaws to an open position, and a releasable locking mechanism for securing the handles and jaws in a closed position, the method comprising:
positioning the metal plate having a forwardly extending blade which comprises one of the jaws and a rearwardly extending tang into a mold;
molding the handles, molding the pivot and locking mechanism onto the metal plate using a moldable plastic, such that one of the handles is molded onto the tang of the metal plate to form the first elongated member, and the pivot is molded into the central aperture; and
mounting the spring in a position for biasing the tool to an open position.

18. The method of claim 17, wherein the molding step further comprises:
molding the second elongated member entirely of plastic, the jaw thereof comprising an anvil configured for engagement with the blade, and the pivot comprising a rounded post integral with the second member, which post is formed by filling in the central aperture in the metal plate;
molding the handle of the first elongated member; and
molding the locking mechanism, wherein the locking mechanism comprises a catch mounted in a second aperture provided in the plate at a position offset from the central aperture, and a first projection formed on the second elongated member, wherein the second elongated member, the handle of the first elongated member, and the catch are each molded in separate cavities.

19. The method of claim 18, wherein the catch includes a post mounted for rotation in the second aperture, the post extending through the second aperture from an outer surface of the plate to an inner surface thereof and having an enlarged head which retains the catch in the second aperture, and an arm extending from the post on the outer surface of the plate, the arm having a second projection on a distal end thereof configured for releasable engagement with the first projection, which first projection is formed on the handle of the second elongated member, and
the mold further comprises a pair of mold sections including cavities disposed on opposite sides of the metal plate for forming the catch.

* * * * *